July 1, 1958 M. G. SCHEIDER 2,841,107
FLEXIBLE FLOATING DECK
Filed Nov. 29, 1955

INVENTOR
MAURICE G. SCHEIDER
BY
ATTORNEYS

United States Patent Office 2,841,107
Patented July 1, 1958

2,841,107
FLEXIBLE FLOATING DECK

Maurice G. Scheider, Bel Air, Md., assignor, by mesne assignments, to the United States of America as represented by the Secretary of the Navy Application November 29, 1955, Serial No. 549,898

1 Claim. (Cl. 114—43.5)

The present invention relates to a flexible floating deck and more particularly to a flexible floating deck having aircraft arresting gear attached thereto.

In the prior art, water-borne landing surfaces have either been large, expensive ships, such as aircraft carriers, or floating platforms of complex construction and considerable extent.

The present invention contemplates a floating deck having for its main supporting surface a flexible deck, of fabric or the like, and having mounted thereon a simple aircraft arresting gear comprising novel arresting means.

An object of the present invention is the provision of a floating aircraft landing platform of extremely simple construction.

Another object is to provide such a platform in which the water beneath it serves to absorb a substantial part of the landing shocks.

A further object of the invention is the provision of a floating aircraft landing platform of characteristics enabling "zero-length" landing of aircraft.

Other objects and many of the attendant advantages of this invention will be readily appreciated as the same becomes better understood by reference to the following detailed description when considered in connection with the accompanying drawings wherein.

Figure 1:
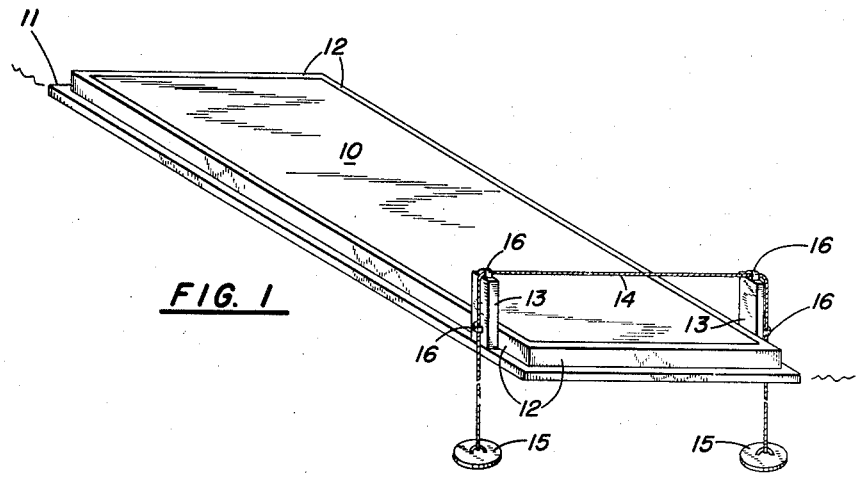
Fig. 1 is a perspective view of a preferred embodiment of the invention.
Figure 2:
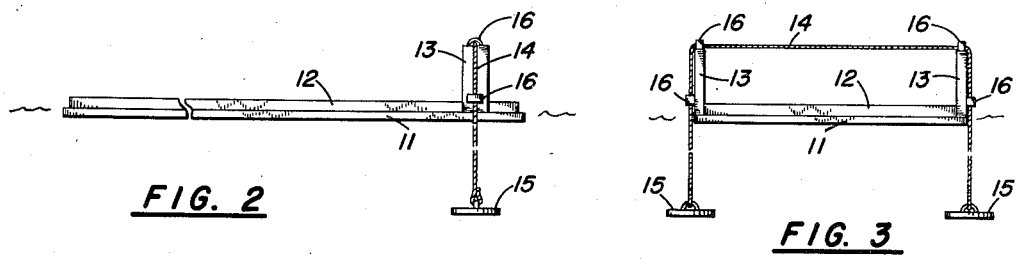
Fig. 2 illustrates a side elevation thereof.
Figure 3:
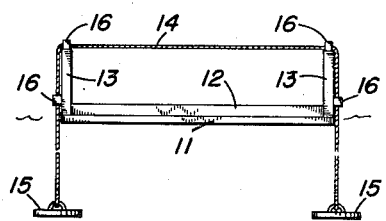
Fig. 3 is an end view thereof.

Referring now to the drawings, wherein like reference characters designate like or corresponding parts throughout the several views, there is shown in Fig. 1 a platform having a deck 10 peripherally bounded by buoyant chamber means 12 which is fastened to a rigid framework 11. Uprights 13 are fastened to the framework 11; between uprights 13 passes a rope or cable 14 having a midportion spanning the deck and end portions passing downwardly alongside uprights 13. The ends of cable 14 are attached to high drag devices which may comprise plates or sea anchors 15 or, alternatively, may comprise spring loaded variable area devices. Cable 14 is passed through appropriate guides, such as the eyes 16, affixed to uprights 13.

Figure 4:
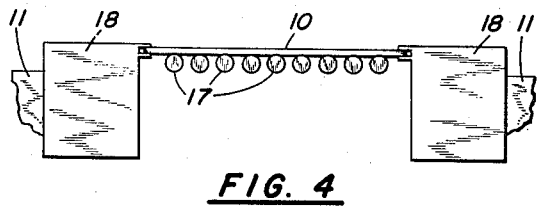
Fig. 4 is a view showing details of construction of one embodiment.
Figure 5:
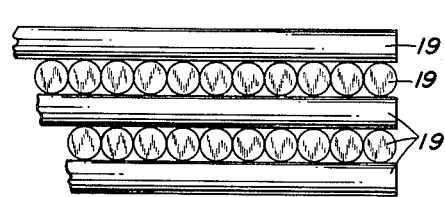
Fig. 5 is a view showing details of construction of a second embodiment.

Referring now to Fig. 4, it may be seen that the deck 10 is partially supported by air tubes 17 lying thereunder, and by buoyant chambers 18, 18 comprising inflatable air chambers or pontoons. In Fig. 5, the buoyant chambers may be seen to comprise air tubes 19 placed in a criss-cross sandwich fashion for strength.

In operation, an aircraft having an extendable hook will approach the floating deck of the invention in landing attitude, and its hook will engage cable 14. The cable 14 will then offer considerable resistance to the forward motion of the airplane due to drag devices 15. Additionally, the entire floating deck will be urged forwardly through the water, and will move an amount dependent upon its hydrodynamic resistance and the velocity and mass of the airplane. This action has the advantage of permitting a shorter deck than would be necessary with a fixed apparatus. The landing shock of the airplane will be absorbed by the tubes 17 (similar to the action of a trampoline) and by the water lying beneath said tubes. Thus, the conventional landing gear may be simplified and reduced in weight, or eliminated, through use of the present invention.

It will be thus be seen that the present apparatus provides a relatively light, cheap and mobile water borne landing surface for aircraft. Power to move it may be supplied by boats, self-carried engines or the airplane which has landed on the deck.

Obviously many modifications and variations of the present invention are possible in the light of the above teachings. It is therefore to be understood that within the scope of the appended claim the invention may be practiced otherwise than as specifically described.

What is claimed is:

A waterborne craft forming an airplane runway for receiving landing aircraft thereon comprising an elongated free-floating raft, said raft having a rigid framework extending about the periphery thereof and buoyant means underlying said framework, flexible fabric sheet means extending between said framework, and an arresting gear supported on said framework at the landing end of the runway comprising a pair of spaced uprights, a cable extending over said uprights and downwardly below said rafts into the water, and sea anchors attached to the lower-most ends of the cable to restrict lateral movement of the raft and restrain extensive forward movement thereof when an aircraft engages the cable during a landing operation.

References Cited in the file of this patent

UNITED STATES PATENTS

| | | |
|---|---|---|
| 4,356 | Day | Jan. 15, 1846 |
| 237,693 | Oliver | Feb. 15, 1881 |
| 534,275 | Meyer | Feb. 19, 1895 |
| 1,828,251 | Kiwull | Oct. 20, 1931 |
| 2,160,449 | Weichardt et al. | May 30, 1939 |
| 2,342,773 | Wellman | Feb. 29, 1944 |
| 2,355,757 | Spanel | Aug. 15, 1944 |
| 2,374,938 | Hundley | May 1, 1945 |
| 2,583,125 | Shannon | Jan. 22, 1952 |

FOREIGN PATENTS

| | | |
|---|---|---|
| 566,646 | Germany | Dec. 19, 1932 |
| 955,651 | France | July 4, 1949 |